April 14, 1964 L. G. O. DAHLGREN 3,128,687
FILM FEEDING MECHANISMS FOR ROLL FILM CAMERAS
Filed July 2, 1963 2 Sheets-Sheet 2
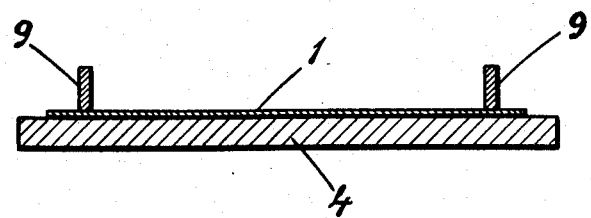
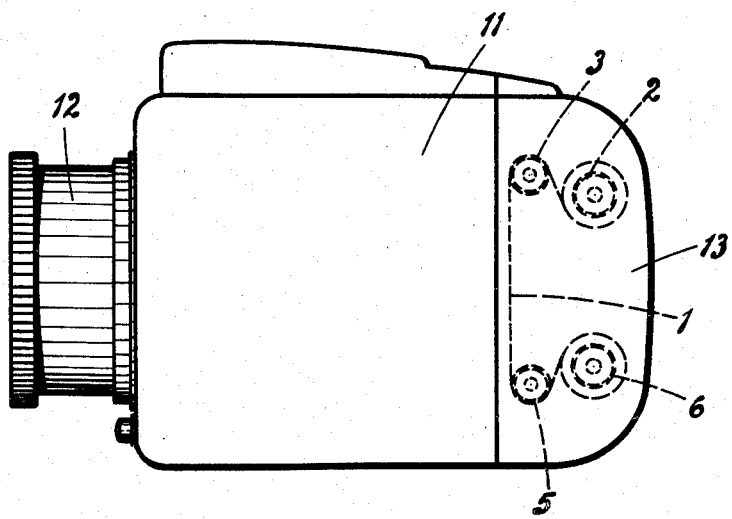
INVENTOR
LENNART GUNNAR OSKAR DAHLGREN
BY *Linton and Linton*
ATTORNEYS

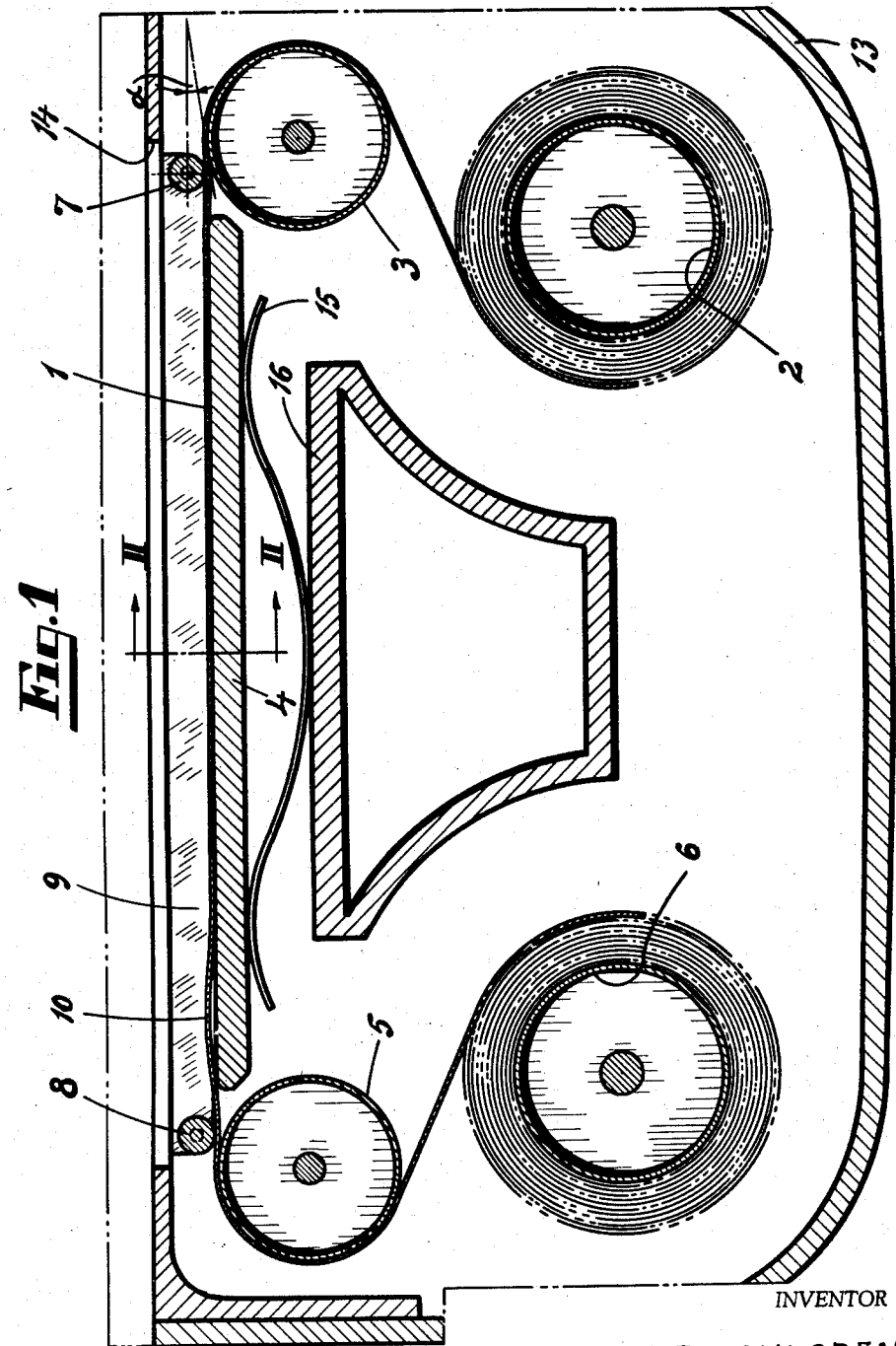

United States Patent Office 3,128,687
Patented Apr. 14, 1964

3,128,687
FILM FEEDING MECHANISMS FOR ROLL FILM CAMERAS
Lennart Gunnar Oskar Dahlgren, Goteborg, Sweden, assignor to Fritz Victor Hasselblad, Goteborg, Sweden
Filed July 2, 1963, Ser. No. 292,331
Claims priority, application Sweden July 10, 1962
1 Claim. (Cl. 95—34)

The present invention relates to film feeding mechanisms for roll film cameras comprising a supply roller and a take-up roller for the film and of the kind wherein adjacent two oppositely disposed side edges of the film opening there are provided two idler rollers and wherein there is provided a pressure plate which is urged towards the film opening for pressing the edge portions of that portion of the film strip which extends between the idler rollers against the edges of two guide ribs, said guide rib edges being situated in the focal plane of the camera. More specifically, the invention relates to such film feeding mechanisms of the kind mentioned in which there is provided, adjacent each of those edges of the pressure plate which are disposed adjacent the idler rollers, a guide roller which is lying against the sensitized side of the film and which is disposed in substantially tangential relation to the focal plane.

A serious disadvantage with previously known film feeding mechanisms of the kind mentioned above is the formation of distorted portions in the film strip in the form of bulges or bubbles. Such bulges are formed as a consequence of the film being bent around the idler roller disposed adjacent the supply roller, especially when one and the same portion of the film strip has been lying around the idler roller for a longer period in which case the bending of the film tends to become permanent. When such a distorted portion of the film is fed to a position extending across the film opening the edge portions of the film strip will be pressed flat between the pressure plate and the guide ribs but between the edges of the film strip there will be formed a bulge, the depth of which is largest at the middle of the film strip and decreases towards the edges. This bulging portion of the film formed by the idler roller will be situated adjacent the front end (seen in the film feed direction) of that portion of the film strip which extends across the film opening, and in certain cases the bulge may extend across approximately a third of the length of said film portion. A second bulge of smaller extension than the first one will often be formed at the opposite end of the film portion drawn across the film opening and seems to be caused by the bending of the film around the supply roller. The bulges cause a noticeable distortion of the picture when the film is exposed.

The present invention, which has for its object to provide an arrangement by means of which the abovementioned drawback will be greatly reduced, is characterised in that said guide rollers which lie against the sensitized side of the film in a substantially tangential relation to the focal plane are situated one between each edge of the pressure plate and the adjacent idler roller and further characterised in that when the pressure plate is in the position pressing the edge portions of the film against the guide ribs a plane coinciding with that side of the pressure plate which faces the film intersects the envelope surfaces of the idler rollers.

The invention will be more closely described herebelow with reference to the accompanying drawings wherein:

FIGURE 1 is a section through a film feeding mechanism according to the invention, FIGURE 2 is a cross section taken on the line II—II in FIG. 1, and FIGURE 3 is a side view of a camera embodying the invention.

In FIGURE 3 numeral 11 indicates a camera housing provided at the front side with a lens assembly indicated at 12 and having detachably connected to its rear side a magazine 13 containing supply and take-up rollers 2 and 6, respectively, for a length of roll film 1 which extends partly around idler rollers 3 and 5. As will appear from FIG. 1 the idler rollers 3 and 5 are disposed at opposite sides of a film opening 14 provided in that side of the magazine which faces the lens assembly 12, and the portion of the film 1 extending between the idler rollers 3 and 5 extends across one side of a pressure plate 4 which is biased by a leaf spring 15 inserted between the back of the pressure plate and an abutment 16 forming part of the magazine 13 to press the film against the edges of two guide ribs 9 secured to the magazine 13 in a position extending along the edge portions of the film strip at right angles to the axes of the idler rollers. Those edges of the guide ribs against which the film is pressed by means of the pressure plate 4 are disposed in the focal plane of the camera so as to correctly position the sensitized surface of the film which faces the film opening 14. Conventionally, a paper backing will be provided on the opposite side of the film, but for the purpose of clarity such backing is not shown in the drawing.

Between the idler roller 3 and the adjacent edge of the pressure plate 4 there is provided a guide roller 7 which lies against the sensitized side of the film. A similar guide roller 8 is provided between the opposite edge of the pressure plate 4 and the idler roller 5. In the embodiment shown, the guide rollers 7 and 8 are carried between the ribs 9 near the ends thereof. The idler rollers 3 and 5 are so disposed relative to the focal plane, that is the plane in which the sensitized side of the film is disposed when the film strip is pressed against the guide ribs 9 by means of the pressure plate 4, and relative to the guide rollers 7 and 8 which are disposed in tangential relation to the focal plane, that when the pressure plate 4 is in the position illustrated in FIGURES 1 and 2 pressing the film strip against the guide ribs 9 a plane coinciding with that side of the pressure plate which faces the film will extend through the envelope surfaces of the idler rollers 3 and 5. Due to this the portion of the film strip extending between the idler roller 3 and the guide roller 7 will be inclined relative to a plane parallel to the focal plane by the angle indicated by α in FIGURE 1. The portion of the film strip extending between the guide roller 8 and the idler roller 5 will have a corresponding inclination. In the embodiment shown the angle α is approximately 8°.

It has been shown that by means of the arrangement described above the size of the bulges formed in the film will be reduced to a very great extent. In FIGURE 1 numeral 10 indicates a bulge caused by the fact that the film portion in question has been lying around the idler roller 3 for an extended period of time. This bubble is of very small extension in comparison to the bubbles produced in previously known film feeding mechanism. As already mentioned, previously known film feeding mechanisms sometimes produce a second bulge which will become situated adjacent the opposite end of the film portion fed across the film opening. This second bulge is completely eliminated by means of the arrangement according to the invention.

The invention is not limited to the embodiment hereinbefore described and as shown in the drawings, said embodiment being susceptible of various modifications with respect to its details without departing from the basic concept of the invention.

What I claim is:

In a roll film camera having means defining a film opening across which a portion of the roll film extends, a film feeding mechanism comprising supply and take-up rollers and two idler rollers disposed adjacent opposite edges of said film opening, the film passing from the supply roll over one of said idler rollers, across the film opening with the sensitized side facing said opening, around the second idler roller and to the take-up roller, two guide ribs disposed adjacent opposite edges of the film opening and at right angles to the axes of said idler rollers and having edges disposed in the focal plane of the camera, a pressure plate extending substantially between said idler rollers behind the film portion extending therebetween, means urging said pressure plate towards the back of the film to press the film against said guide rib edges, two guide rollers being provided one between each of said idler rollers and the adjacent edge of said pressure plate in a position lying against the sensitized side of the film and in substantially tangential relation to the focal plane, said idler rollers being so disposed that a plane coinciding with that side of the pressure plate which faces the film intersects the envelope surfaces of said idler rollers.

No references cited.